US010641738B2

United States Patent
Guibert et al.

(10) Patent No.: US 10,641,738 B2
(45) Date of Patent: May 5, 2020

(54) DEVICE AND METHOD FOR NON-DESTRUCTIVE ULTRASOUND INSPECTION OF STRUCTURES MADE OF COMPOSITE MATERIAL

(71) Applicant: Airbus (S.A.S.), Blagnac (FR)

(72) Inventors: Frank Guibert, Toulouse (FR); Cedric Chamfroy, Bruguieres (FR); Mona Rafrafi, Toulouse (FR)

(73) Assignee: Airbus (S.A.S.), Blagnac (FR)

( * ) Notice: Subject to any disclaimer, the term of this patent is extended or adjusted under 35 U.S.C. 154(b) by 214 days.

(21) Appl. No.: 15/655,635

(22) Filed: Jul. 20, 2017

(65) Prior Publication Data

US 2019/0025258 A1    Jan. 24, 2019

(51) Int. Cl.
    *G01N 29/04*      (2006.01)
    *G06T 19/00*      (2011.01)
    (Continued)

(52) U.S. Cl.
    CPC ............. *G01N 29/04* (2013.01); *G01B 17/00* (2013.01); *G01B 17/025* (2013.01); *G01B 17/06* (2013.01);
    (Continued)

(58) Field of Classification Search
    CPC .. G01N 29/04; G01N 29/043; G01N 29/0645; G01N 29/4436; G01N 29/2493;
    (Continued)

(56) References Cited

U.S. PATENT DOCUMENTS

| | | |
|---|---|---|
| 4,205,554 A | 6/1980 | Uchida et al. |
| 5,032,734 A | 7/1991 | Orazio, Jr. et al. |
| | (Continued) | |

FOREIGN PATENT DOCUMENTS

| | | | | |
|---|---|---|---|---|
| JP | 04301762 | 10/1992 | | |
| KR | 20170044974 A | * | 4/2017 | ............ A61B 8/145 |
| WO | 2006009669 | 1/2009 | | |

OTHER PUBLICATIONS

Visualisation of ultrasonic testing data using augmented reality J. Meyer et. al Bundeswehr Research Institute for Materials, Fuels and Lubricants (WIWeB) presented at Aero NDT 2015 published Apr. 2016 https://www.ndt.net/search/docs.php3?showForm=off&id=18956 (Year: 2016).*

*Primary Examiner* — Natalie Huls
*Assistant Examiner* — Monica S Young
(74) *Attorney, Agent, or Firm* — Greer, Burns & Crain, Ltd.

(57) ABSTRACT

A device and method for detecting delamination in a panel of laminated composite. The device comprises an ultrasonic probe with a plurality of elementary transducers, an electronic device in communication with the elementary transducers, and a display device. The transducers emit an ultrasonic pulse and receive a pulse reflected by an element in the panel. The received pulses are grouped into clusters of healthy, or non-damaged, zones and damaged zones. The dimensions of the damaged zones are based upon the limits formed by healthy zones. A display of the defect with dimensions is produced on the display device. A scale image of the defect with dimensions, via paper or digital overlay, can be placed on the panel.

16 Claims, 6 Drawing Sheets

(51) Int. Cl.
    *G01B 17/00*  (2006.01)
    *G01B 17/06*  (2006.01)
    *G01N 29/44*  (2006.01)
    *G01N 29/06*  (2006.01)
    *G01B 17/02*  (2006.01)
    *G01N 29/24*  (2006.01)

(52) U.S. Cl.
    CPC ....... *G01N 29/043* (2013.01); *G01N 29/0645* (2013.01); *G01N 29/4436* (2013.01); *G06T 19/006* (2013.01); *G01N 29/2493* (2013.01); *G01N 2291/0231* (2013.01); *G01N 2291/0289* (2013.01)

(58) Field of Classification Search
    CPC ... G01N 2291/0231; G01N 2291/0289; G01B 17/00; G06T 19/006
    USPC .......................................................... 73/628
    See application file for complete search history.

(56) References Cited

U.S. PATENT DOCUMENTS

| | | | |
|---|---|---|---|
| 5,698,787 A * | 12/1997 | Parzuchowski | G01N 29/2418 73/583 |
| 6,092,420 A | 7/2000 | Kimuara et al. | |
| 6,201,887 B1 * | 3/2001 | Zheng | G01S 7/5205 382/128 |
| 6,397,681 B1 | 6/2002 | Mizunoya et al. | |
| 6,443,012 B2 | 9/2002 | Beardmore | |
| 7,478,569 B2 * | 1/2009 | Bossi | G01N 27/902 73/625 |
| 8,798,940 B2 | 8/2014 | Imbert et al. | |
| 9,632,063 B2 | 4/2017 | Metayer et al. | |
| 10,416,121 B2 * | 9/2019 | Takahashi | B32B 5/10 |
| 2009/0217763 A1 | 9/2009 | Yamano | |
| 2010/0126277 A1 | 5/2010 | Wu et al. | |
| 2010/0207620 A1 | 8/2010 | Gies | |
| 2010/0319455 A1 * | 12/2010 | Ihn | G01N 29/069 73/603 |
| 2011/0088476 A1 | 4/2011 | Yamano et al. | |
| 2011/0113885 A1 | 5/2011 | Eued et al. | |
| 2011/0174522 A1 | 7/2011 | Simmons | B32B 5/26 174/122 R |
| 2013/0250719 A1 * | 9/2013 | Kollgaard | G01N 27/90 367/7 |
| 2015/0049579 A1 * | 2/2015 | Skoglund | G01N 29/069 367/7 |
| 2015/0160166 A1 * | 6/2015 | Metayer | G01N 29/07 73/597 |
| 2016/0011151 A1 * | 1/2016 | Campbell Leckey | G01N 29/043 73/601 |
| 2017/0076495 A1 * | 3/2017 | Gabrys | G06F 3/011 |
| 2017/0176393 A1 * | 6/2017 | O'Donnell | G01N 29/46 |
| 2018/0120268 A1 * | 5/2018 | Georgeson | G01N 29/07 |
| 2018/0202949 A1 * | 7/2018 | Smith | G01N 23/20008 |
| 2018/0259486 A1 * | 9/2018 | Babcock, IV | G01N 21/84 |
| 2019/0111637 A1 * | 4/2019 | Hanna | B29C 70/745 |

\* cited by examiner

DEVICE AND METHOD FOR NON-DESTRUCTIVE ULTRASOUND INSPECTION OF STRUCTURES MADE OF COMPOSITE MATERIAL

FIELD OF THE INVENTION

The present invention relates to the non-destructive inspection of structures and, more particularly, to a device and a method for non-destructive ultrasound inspection of structures made of laminated composite material, such as, for example, panels used to produce the fuselage or the wing elements of an aircraft.

BACKGROUND OF THE INVENTION

During the life of the aircraft, a panel made of laminated composite material used to produce a fuselage or a wing element undergoes impacts on its free face, also called a front face, as a result of, for example, collisions with birds, or from tools dropped during maintenance operations. The panels made of laminated composite materials are produced by a stacking of a plurality of layers, formed from fibers, held together by means of a hardened resin. The impacts on the free face of the panels degrade the structure of the panel because they cause delaminations between its layers. However, a simple visual inspection is often not sufficient to detect delaminations in the panels. Accordingly, devices are needed to inspect the panels for delaminations.

EP1759195 describes an ultrasound detection device for revealing whether delaminations are present in the thickness of a panel, following an impact. This device sends, via a probe in contact with the front face of the inspected panel, an ultrasound pulse. The device also collects the pulse reflected by the back face of the panel. The device then compares a form and a turnaround time of a signal, called reference signal, reflected by the back face of the panel obtained when the panel is healthy. A difference in form and turnaround time between the two reflected signals beyond acceptable limits reveals a delamination.

The device of EP1759195 requires, prior to use, a calibration on a healthy panel having the same dimensions as the panel to be inspected in order to obtain a form and a turnaround time for the reference signal. As a result of this calibration, this device is very effective for inspecting panels that have a constant thickness, however the device provides inaccurate results when the probe is moved over a length of a panel which exhibits a changing thickness along its length. Currently, the fuselage and/or the wing elements of many aircraft are formed with laminated composite panels having a non-constant thickness. Thus, the device of EP1759195 cannot be used accurately on such aircraft.

To overcome the shortcomings of devices like those in EP1759195, the applicant of the present application has previously provided a method and device to inspect such panels with non-uniform thickness. Specifically, U.S. Pat. Pub. No. 2015/0160166, the entirety of which is incorporated herein by reference, discloses a device which indicates delamination on panels having a non-constant thickness. Additionally, the device does not require an initial calibration on a healthy panel. However, while effective for its intended use, when the device disclosed in U.S. Pat. Pub. No. 2015/0160166 is used to inspect panels, the operator is required to analyze the panel and estimate the dimensions of the detected delamination. In other words, the device does not provide dimensions of the detected defects via a non-destructive ultrasound inspection process.

Therefore, the present invention is directed at remedying some or all of these shortcomings and making it possible to detect a defect and provide a dimension to this defect automatically and accurately via a non-destructive ultrasound inspection process.

SUMMARY OF THE INVENTION

Accordingly, the present invention provides a device and method for a non-destructive ultrasound inspection of a composite panel which provides a dimension associated with any detected defects, such as a delimitation, in the panel. The present diagnostic device and method indicate defects via an ultrasound of the inspection zone and producing a C-scan mapping of the inspection zone which indicates the defects. The inspection is performed without first any initial setting or manual calibration and does not require display of any operator signals. Rather, the inspection utilizes a verification, prior to the inspection, of correct operation of the diagnostic device using a function check part. The function check part is a part made from a material, plastic for example, that has the same properties as the composite part to be inspected and that contains one or more defects at known location(s) and having known dimension(s).

According to the present invention, the diagnostic device utilizes results from measurement points which exhibit a good ultrasound coupling and a normalized amplitude to generate the C-scan mapping. Thus, the present diagnostic device directly provides the size of the defects without intervention of the operator and uses, if available, characteristics of the inspected zone obtained from a digital model. Additionally, the present diagnostic device makes it possible to transfer an outline of the defects directly onto the zone by using a printout (on paper or other material that can be laid on the zone) or use an augmented reality display or tool to show the positioning of the defects on the panel.

In the various embodiments and aspects of the present invention, combinable in any manner, the device and method of the present invention provide for:

the automatic setting of the specific parameters for the ultrasound inspection, including the position of the detection gates regardless of the type of sensor used (single- and multi-element);

the verification, in real time, of a good coupling for each firing in order to acquire only the optimal data in terms of ultrasound coupling;

the detection of the dead elements (i.e., non-functional piezoelectric transducers on the sensor) automatically;

the adjustment, in real time, of the gain applied in reception on each firing in order to maintain the amplitude of a specific echo within a reference range, in order to normalize the received signals;

the automatic verification of the correct operation of the entirety of the measurement system by scanning the function check part (acquisition of the A-scans and of the gate results) according to quantitative criteria on the data acquired;

the realignment of acquisition bands according to one of the scanning axes; and, the automatic dimensioning of the defects and the generation of an illustrative and quantitative report describing these defects and their location on the C-scan.

Additionally, the various embodiments and aspects of the present invention optionally:

consider structural information contained in a digital twin (DMU) of the panel under inspection (thickness of the zone, form, and location of the noteworthy structural elements such as the feet of stiffeners, etc.) during the automatic dimensioning in order to assist the operator;

produce a 1:1 scale image of the defects intended for printout in order to facilitate the plotting of the outline of the defects on the inspected zone; and, display the defects, via an augmented reality display device, directly on the inspected zone.

Therefore, according to one aspect of the present invention, a device for detecting defects in a thickness of a laminated composite panel is provided. The device includes an ultrasonic probe, an electronic device, and a display device. The ultrasonic probe has a wheel housing a plurality of elementary transducers. The wheel is configured to be placed into contact with a laminated composite panel. In communication with each of the transducers is the electronic device which is configured to control emission and reception of ultrasonic pulses by the probe by the activation of at least one of the elementary transducers. In communication with the electronic device is the display device which is configured to analyze reflections of ultrasonic signals received by the elementary transducers during an inspection of said laminated composite panel in order to detect a defect. The display device has a screen configured to display at least one dimension, or two dimensions, or all three dimensions of the detected defects. In some aspects, a C-scanning mapping is displayed to represent all three dimension of the detected defects.

According to another aspect of the present invention, a method for detecting delamination in a panel of laminated composite is provided. The panel includes a front face, and the method uses a diagnostic apparatus which includes an ultrasonic probe having a plurality of elementary transducers, an electronic device in communication with the elementary transducers, and a display device. The method includes: emitting ultrasonic pulses from the elementary transducers into the panel while the ultrasonic probe is in contact with the front face and receiving ultrasonic pulses reflected by the panel; determining a value of a coupling indicator representing a coupling of the probe with the front face, wherein the determination is performed using data representing the emitted ultrasonic pulses and the received ultrasonic pulses; comparing a value of the coupling indicator with a predetermined value; and, if the value of the coupling indicator is equal to the predetermined value, activating a sequence of the elementary transducers by: emitting an ultrasonic pulse by each of the plurality of elementary transducers toward the panel; receiving by each of the elementary transducers a pulse reflected by the panel; and, determining a dimension of a defect based on the plurality of reflected pulses received.

In yet another aspect of the present invention, another method for detecting delamination in a panel of laminated composite is provided. The panel includes a front face, and the method uses a diagnostic apparatus which includes an ultrasonic probe having a plurality of elementary transducers, an electronic device in communication with the elementary transducers, and a display device. The method includes: determining if the ultrasonic probe is in contact with the front face; and, if the ultrasonic probe is determined to be in contact with the front face, activating a sequence of the elementary transducers by: emitting an ultrasonic pulse by each of the plurality of elementary transducers toward the panel; receiving by each of the elementary transducers a pulse reflected by the panel; sorting the reflected pulses received according to one or more attributes of the reflected pulses into clusters, wherein the clusters define zones without damage, and wherein a space between the clusters define a defect zone; determining a dimension of a defect by using the clusters as limits.

Additional aspects, objects, embodiments, and details of the invention, which are contemplated to be combined in any manner, are set forth in the following detailed description.

DETAILED DESCRIPTION OF THE DRAWINGS

One or more exemplary embodiments of the present invention will be described below in conjunction with the following drawing figures, in which.

DETAILED DESCRIPTION OF THE INVENTION

With these above general aspects in mind, one or more embodiments of the present invention will be described with the understanding that the following description is not intended to be limiting.

Figure 1:
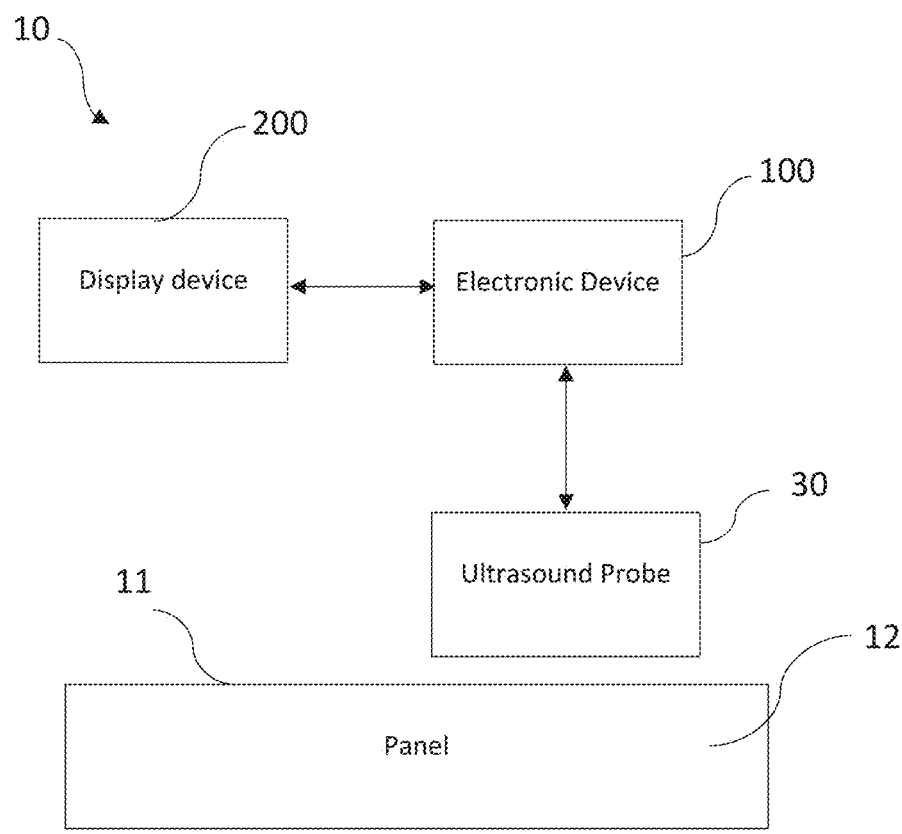
FIG. 1 shows a schematic diagram of a device according to one or more embodiments of the present invention.

With reference to FIG. 1, the present invention provides a diagnostic device, generally designated 10, configured for inspecting a panel 12 which is a laminated composite material, for example a panel of an aircraft, and detecting any defects, such as delaminations in the thickness of the panel or detachments of feet of stiffeners from the panel. The diagnostic device 10 comprises an ultrasound probe 30, an electronic device 100 (sometimes referred to herein as an acquisition card), and, a display device 200.

The ultrasound probe 30 is, for example, a 5 MHz phased-array, thirty-two element wheel probe available from General Electric. For example, turning to FIG. 2, the ultrasound probe 30 is a roller-type probe comprising, as is known, a body 300 provided with a wheel 34 mounted to rotate freely at an end 304 of the body 300. The wheel 34 is the element of the probe 30 which is intended to be placed in contact with a front face 11 of the panel 12 (FIG. 1) to be inspected.

Figure 2:
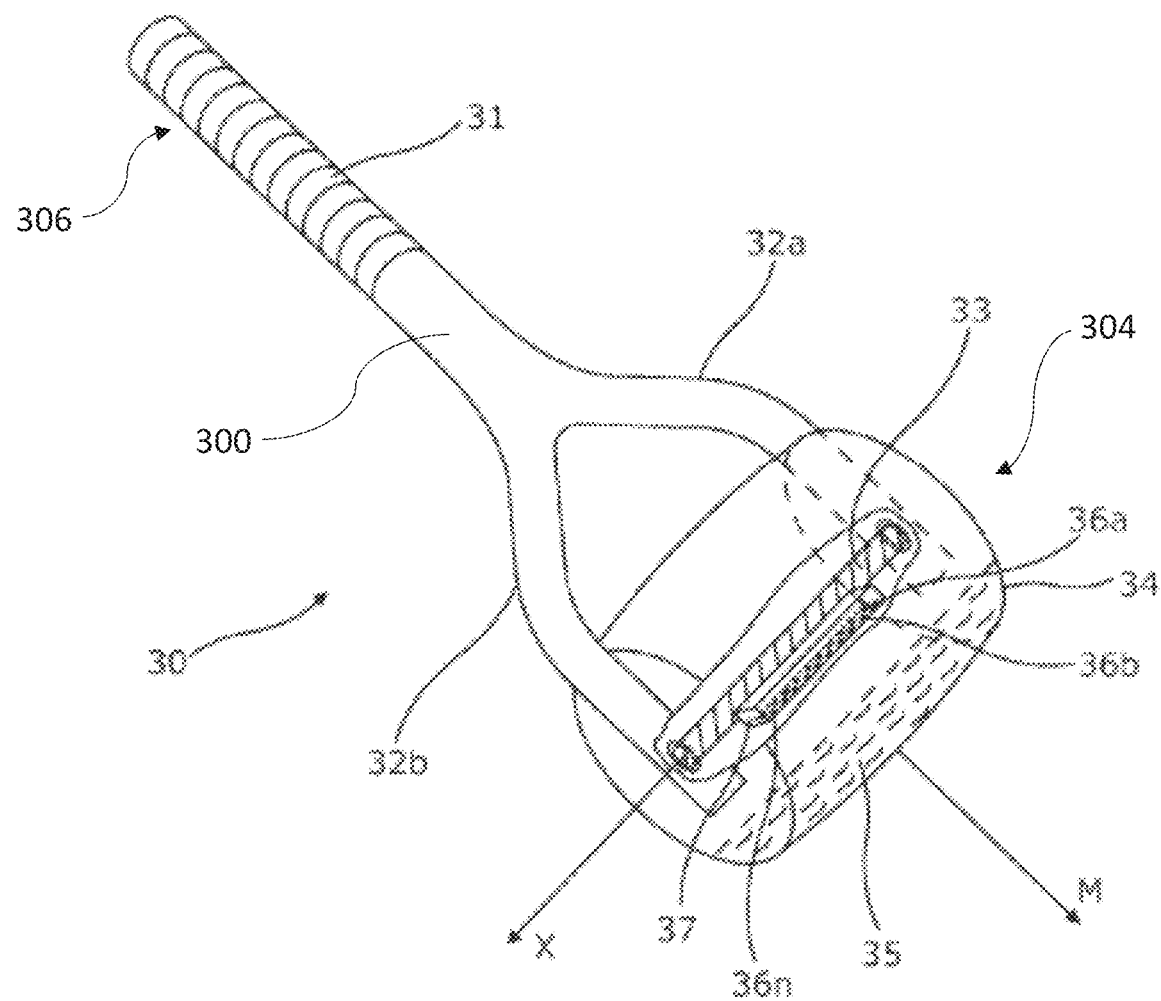
FIG. 2 shows a front perspective view of a probe used in association with a device according to one or more embodiments of the present invention.

According to the example illustrated in FIG. 2, the body 300 of the probe 30 is in the form of a fork comprising a cylindrical tube 31 prolonged by two branches 32a,32b. A free end 306 of the cylindrical tube 31 (opposite the first end 304) forms a handle for an operator. The wheel 34 is rotatably fixed in the space formed between the two branches 32a,32b with a hub 33. The hub 33 is fixed relative to the two branches 32a,32b and rotates about an axis X.

The wheel 34 takes the form of a tire produced with a substantially cylindrical outer membrane made of rubber.

The membrane encloses a liquid 35 that is neutral to ultrasound waves. A plurality of individual transducers 36a, 36b, ..., 36n forming an array of individual transducers is fixed to the hub 33 and housed in the wheel 34. The array of individual transducers 36a, 36b, ..., 36n is preferably arranged on a support 37, of parallelepipedal type, fixed to the hub 33.

The support 37 is fixed on a first face to the hub 33 of the wheel 34, and the individual transducers 36a,36b, ..., 36n are all arranged on the face of the support 37 which is opposite the first face, such that all the individual transducers 36a,36b, ..., 36n emit ultrasound pulses in one and the same direction, herein referred to as a direction of inspection M. In the examples represented, the direction of inspection M is substantially aligned with the longitudinal axis of the tube 31.

Although not depicted in FIG. 2, the electronic device 100 comprises a programmable logic circuit and elements such as analog-digital converters for the transmission of digital signals, directly or indirectly through amplifiers or filters, to the display device 200. The ultrasound acquisition card 100 is, for example, housed in the tube 31 of the probe 30 and is connected to each individual transducer 36a,36b, ..., 36n of the array via a wire link (not shown).

Consequently, an individual transducer 36a,36b, ..., 36n can be activated, by the acquisition card 100, independently of the others. Via the corresponding wire link between an individual transducer 36a,36b, ..., 36n and the acquisition card 100, a pulsed signal sent by the acquisition card 100 to an individual transducer 36a,36b, ..., 36n is converted into an ultrasound pulse by the latter (firing). Conversely, when an individual transducer 36a,36b, ..., 36n receives an ultrasound pulse, the latter sends, to the acquisition card 100, a pulse signal corresponding to the ultrasound pulse received via the corresponding wire link between the individual transducer 36a,36b, ..., 36n and the acquisition card 100.

Thus, the electronic device 100 manages the emission and the reception of ultrasound pulses by the ultrasound probe 30. An exemplary electronic device 100 is an 8×32v2 AGI/M2M data acquisition card. In addition to managing the activation in emission and in reception of the individual transducers 36a,36b, ..., 36n of the array, the electronic device 100 is coupled or in electronic communication with the display device 200.

The display device 200 is provided with a display interface/screen 202 for displaying the C-scan mappings produced by the diagnostic device 10 and is, for example, a Panasonic FZG-1 tablet. The display device 200 comprises, as is known, at least one processor/central processing unit, memory, and hardware (e.g., ports, interfaces, antennas, amplifiers, signal processors, etc.) for wired or wireless communication, a graphic card and peripheral units, input-output interfaces and, a user input device, which is preferably a touch screen. The display device 200 may include software stored in a non-transitory medium, hardware, firmware, etc., containing executable instructions for causing the portable electronic devices to perform one or more steps of example methods. Example software can include an operating system running one or more applications (apps) that perform one or more steps of example methods. Existing operating systems or apps may be configured to cause the portable electronic devices to perform steps of example methods.

The central processing unit of the display device 200 implements a program, to, on the one hand, emit ultrasound pulses by the array of ultrasound transducers 36a,36b, ..., 36n, via the acquisition card 100, and, on the other hand, perform the processing and the analysis of the signals corresponding to the ultrasound pulses received by the acquisition card 100.

Advantageously, a computer program run on the display device 200 automatically:

determines whether the probe 30 has any damaged piezoelectric elements and if there are a number of damaged elements that cannot allow the correct operation of the inspection, and indicates that the probe must be checked (if appropriate);

adjusts the ultrasound parameters of the acquisition card 100 according to the state of the probe 30, such as, adapting the amplitude and time setting using the interface echo of the wheel 34, which makes it possible to mitigate the different acceptable conditions of inflation of the wheel 34;

assesses the quality of the coupling between the group and the inspected zone for each group of piezoelectric elements of the probe 30 which simultaneously emit/receive—groups of piezoelectric elements are excited linearly in order to emit and receive at the same time so that if one of the piezoelectric elements is dead, the other piezoelectric elements of the group allow the inspection; and, adjusts the gain applied by the acquisition card 100 to normalize the amplitude of an echo for each group of piezoelectric elements of the probe 30 which simultaneously emit/receive and the gain of each firing is then adapted to the inspection zone allowing the production of a mapping that is uniform in amplitude independently of the thickness of the inspected part. According to the signature of the input echo, the firing is qualified and adjusted in amplitude in order to ensure its consistency with the adjacent firings.

Figure 3:
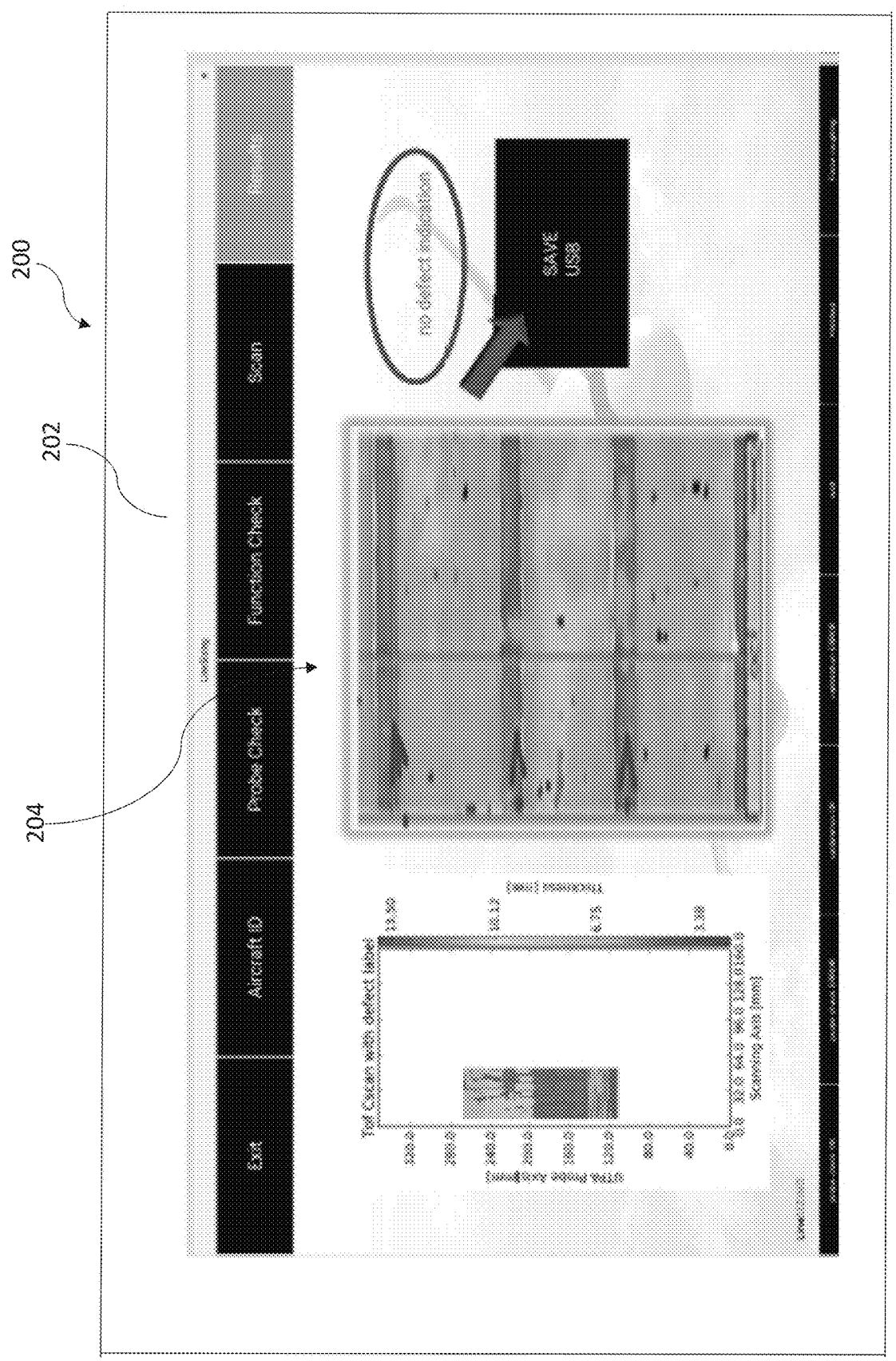
FIG. 3 shows an exemplary display from a display device used in association with a device according to one or more embodiments of the present invention.

As can be seen in FIG. 3, the screen 202 of the display device 200 displays at least one a window 204 which indicates at least one, preferably two, and most preferably all three dimensions of a defect (discussed below), for example with a mapping of C-scan type (i.e., a two-dimensional presentation of data displayed as a top or planar view of a test piece, similar in its graphic perspective to an X-ray image, where color represents the gated signal amplitude or depth (i.e., third dimension) at each point in the test piece mapped to its position. Planar images can be generated on flat parts by tracking data to an X-Y position.).

Figure 4:
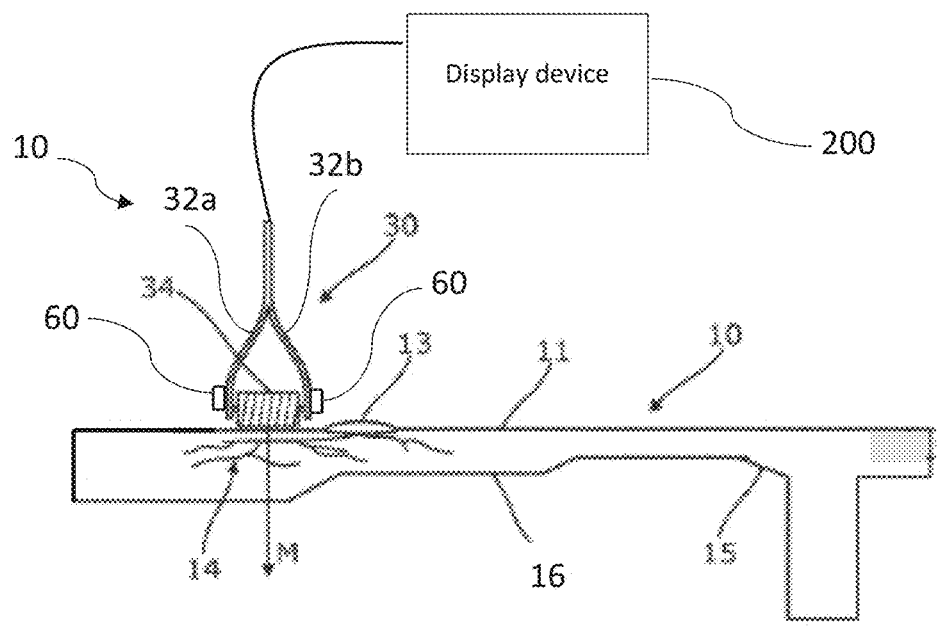
FIG. 4 shows a cross-sectional view of the thickness of a panel inspected by a device according to the invention, the panel having been subjected to an impact on its front face which has given rise to delamination.

Turning to FIG. 4, when the diagnostic device 10 according to the invention is being used during an inspection, the probe 30 is pressed, in position of use, at the level of its wheel 34 onto the front face of a panel to be inspected such that the direction of inspection M is substantially parallel to the transverse direction of the panel. The probe 30 is advantageously displaced, via its wheel 34, on the front face of the panel. In FIG. 4, the diagnostic device 10 performs an inspection of the panel 12 which has undergone an impact 13 on its front face 11 having resulted in delaminations 14. The probe 30 is represented pressed against the front face 11 of the panel, in immediate proximity to the impact 13.

The inspection preferably proceeds by inspection strips from bottom to top (or top to bottom) according to a direction of inspection: a first strip is completed, then the probe 30 is moved to the left or to the right and the inspection proceeds from top to bottom (or bottom to top) over a second inspection strip, and so on. When there are no longer any white bit cells on the inspection zone represented on the mapping of C-scan type represented on the screen 202 of the display device 200, the acquisition is complete.

Optionally, an optical device 60 emitting a laser line is mounted on each fork 32a, 32b of the probe 30. The optical device 60 assists the operator in guiding the probe in its progression over the inspection zone according to the direction of inspection by emitting lines showing the left and right limits of a strip to be inspected.

During the movement of the wheel 34, the array of individual transducers 36a,36b, . . . , 36n bathes in the liquid 35 such that an interface is formed that is neutral to the ultrasound waves between the array of individual transducers 36a,36b, . . . , 36n and the rubber membrane of the wheel 34. An operator sprays the part to be inspected with an acoustic coupling liquid solution before the inspection to allow a good propagation of the waves emitted from the wheel 34 to the panel 12.

Each individual transducer 36a,36b, . . . , 36n is a piezoelectric transducer that can be activated both in emission and in reception to, respectively, emit and receive ultrasound pulses. Hereinafter in the description, an ultrasound pulse emitted by an individual transducer 36a, 36b, . . . , 36n following activation in emission will be called firing.

The individual transducers 36a,36b, . . . , 36n are activated in succession, according to an activation sequence, whether in emission or in reception. For example, four elements are activated simultaneously, the signal is received, and then four more elements are activated.

In emission, the multiple firings that are mutually phase-shifted (delayed) make it possible to create a constructive interference beam. In effect, the multiple firings are added together with a single wave front moving at an angle, called scanning angle, defined relative to the direction of inspection M. By modifying the phase-shifts from one firing to another, the scanning angle is modified. The signal supplied by the central processing unit of the display device 200 to the acquisition card 100 then comprises, in addition to the form of the pulsed signal intended to be converted into ultrasound pulse by the individual transducers 36a, 36b, . . . , 36n, the activation sequence, and the phase-shift between the firings. The phase shift between the firings is advantageously determined as a function of the rate of movement of the wheel 34 on the front face 11 of the panel 12, obtained via sensors arranged on the probe 30.

In reception, a multitude of mutually phase-shifted ultrasound pulses is received by the array of individual transducers 36a,36b, . . . , 36n. For each activation sequence, the acquisition card 100 and/or the display device 200 reconstruct a signal, called scanning signal, from the characteristics (amplitude, form, phase) of the different pulses received, from the time of flight of each of the pulses received and from the scanning angle. The scanning signal thus comprises amplitude and time data corresponding to amplitudes and times of arrival of the pulses received. In use, and as will be described later, during the inspection of a panel 12, the scanning signal represents the ultrasound echo profile returned by the panel 12.

The "time of flight" of a pulse received means the time elapsed between the moment of the emission of an ultrasound pulse by an individual transducer 36a,36b, . . . , 36n and the moment of reception by this same individual transducer of the same ultrasound pulse reflected by a medium discontinuity. The echoes are only picked up by the individual transducers and then translated into signals which will be recorded when they reach an amplitude threshold. As a result, the correction of the amplitude is therefore essential in order for the signal to intersect the gate and for the time of flight data to be recorded. Thus, a time of flight mapping representing the thickness of the part C-scan is constructed by the program running on the display device 200 by considering only the echoes that have normalized coupling and amplitude.

The screen 202 of the display device 200 displays one or more windows 204 associated with the inspection and/or the probe. For example, a first window may display data collected data from the inspection (A-scan, C-scan, defect type, etc.). A second window is displayed for launching the automatic checking of all the piezoelectric elements of the probe. In the first step, and when the probe 30 is in vacuum, the central processing unit of the display device 200 measures, for each individual transducer 36a,36b, . . . , 36n, the time of flight, called time of flight in vacuum, of the first pulse received. The first pulse which is received corresponds to an ultrasound pulse reflected by the membrane of the wheel 34 when the probe 30 is not in contact with the panel 12 to be inspected. The central processing unit of the display device 200 also analyzes the form, called reference form, of the signal corresponding to the first pulse received. A third window allows for the acquisition of a C-scan on a function validation block to confirm the nominal operation of the device. A global coupling indicator is put in place by checking the form and the amplitude of the input echo in the material. The coupling indicator set to the value represents a good use of the probe 30, and therefore a good deformation of the wheel 34 after it is pressed onto the front face 11 of the panel 12 in order to ensure the efficiency of the inspection. A fourth window allows for a program to be run for the acquisition in several strips of a C-scan of the zone to be inspected and launching of the automatic dimensioning algorithm A fifth window displays a report of the inspection.

In a method of detecting a defect 14 with the probe 30, in a first step it is determined if the probe 30 is properly coupled to the panel 12. A first global coupling indicator is set to the value "1" if the number of first indicators set to "1" is greater than a parametrizable threshold. The first global coupling indicator set to the value of "1", which represents a good use of the probe 30, and therefore a good deformation of the wheel 34 after it is pressed onto the front face 11 of the panel 12.

Then, and for each individual transducer 36a,36b, . . . , 36n, the central processing unit of the display device 200 measures the rate of deformation of the form of the signal from the pulse reflected by the front face 11 of the panel 12 after a firing with the form of the reference signal. The deformation is due to the difference in impedance between the media (rubber/composite material) passed through by the pulse. When the reference signal is of a Gaussian pulse type, the central processing unit of the display device 200 uses two digital acquisition gates to detect the position of the positive and negative alternations of pulse signal reflected by the front face of the panel relative to those of the Gaussian pulse.

If the rate of deformation is greater than a predetermined rate of deformation, a second Boolean indicator of coupling of the individual transducer is set to "1", in positive logic.

Finally, a second global coupling indicator is set to "1" if the number of second indicators set to "1" is greater than a parametrizable threshold. The second global coupling indicator set to "1" indicates that a clear coupling layer (liquid placed by the operator on the surface of the panel) is present between the membrane of the wheel 34 and the panel 12.

The central processing unit of the display device 200 then performs a logical AND between the first global coupling indicator and the second global coupling indicator. The Boolean result of the logical AND is called coupling indicator. In the coupling mode, the central processing unit of the display device 200 continuously compares the value of the coupling indicator with the value "1". If the coupling indicator has a value equal to "1", the central processing unit of the display device 200 determines that the probe 30 is properly coupled with the front face 11 of the panel 12.

Once the probe 30 is coupled, that is to say that the coupling indicator has a value equal to "1", in a second step, the acquisition of the optimal data of the strip in ultrasound coupling terms begins in order to construct the time of flight mapping. As described above, the central processing unit of the display device 200 reconstructs the scanning signal 33b from the pulses received. The scanning signal 33b represents the ultrasound echo profile of the panel 12.

The ultrasound pulses emitted by the individual transducers 36a, 36b, ..., 36n during an activation sequence pass through the thickness of the panel 12 and are reflected on elements such as the surfaces of the panel 12, the edges 15, and other discontinuities, like delaminations 14.

Figure 6:
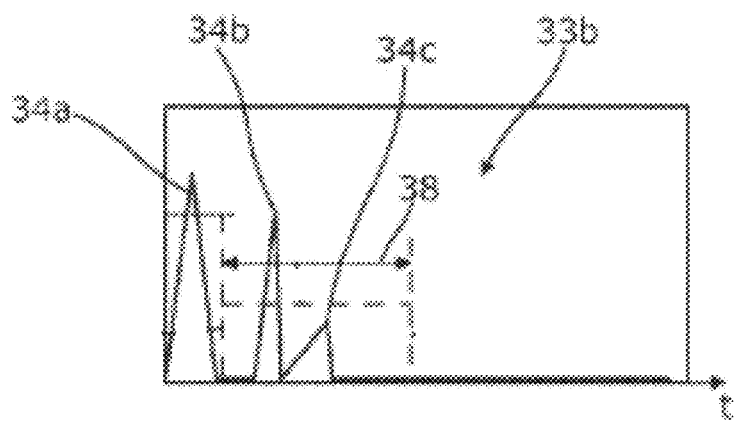
FIG. 6 shows the echo profile, produced by the electronic device, of the inspected panel shown in FIG. 4; and, FIG. 7 shows a scale image of the dimension defect being produced on a augmented reality device.
Figure 5:
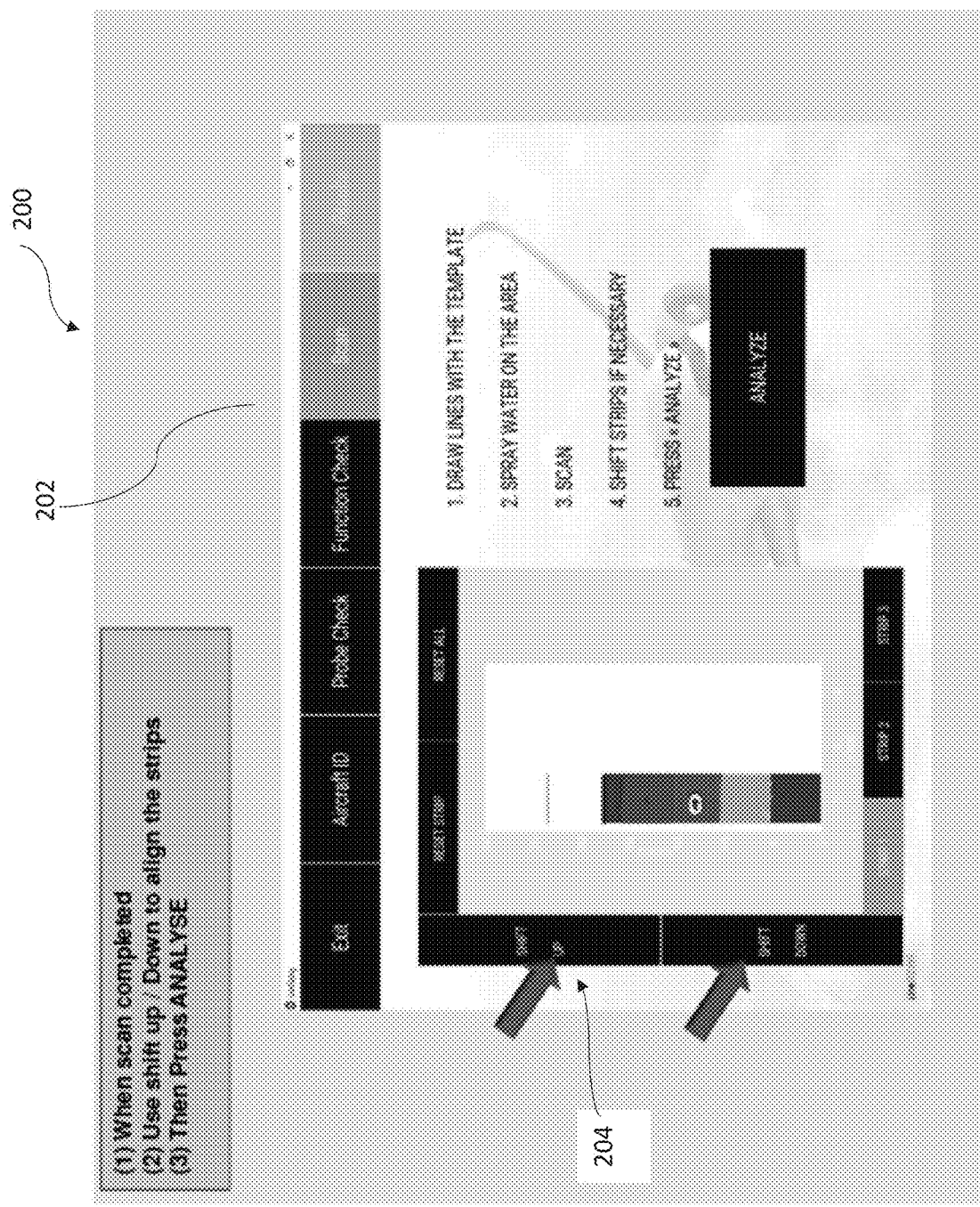
FIG. 5 shows another exemplary display from a display device used in association with a device according to one or more embodiments of the present invention.

These reflections are translated into peaks 34a, 34b, 34c in the scanning signal 33b (see, FIG. 6). The scanning signal 33b thus typically comprises a plurality of peaks 34a, 34b, 34c staggered in time, each peak corresponding to at least one pulse reflected by an element of the panel 12. These time values are translated into a pixel color on the time of flight C-scan display. A color palette is automatically adapted to represent the entire thickness range of the part inspected on colors ranging from blue to red. The time t abscissa of the scanning signal 33b represents the times of flight traveled by the pulses received. Consequently, the time offset between the peaks 34a, 34b, 34c is a function of the time of flight of the pulses received which have been reflected by the elements 11, 14, 15, 16 of the panel 12. The C-scan mapping will therefore read and record the different time-of-flight values to display them on the C-scan display.

This C-scan mapping is then analyzed by an algorithm for automatically dimensioning defects. The algorithm will first sort the zones according to their thickness and produce "clusters". These clusters will then be entered with characteristics making it possible to define zones without damage. The other zones are indicated as doubtful zones. In the doubtful zones, some criteria like the presence of echo in 1 mm of material or of geometry will make it possible to define the defect zones. Then, the defect zones are dimensioned by using the healthy zones as limit. An illustrative and quantitative report describing these defects and the location on the C-scan is then generated by and displayed on the display device 200, for example in the window 204.

It will be understood from reading the above description that the diagnostic device 10 according to the invention for detecting a delamination 14 in the thickness of a panel 12 made of laminated composite allows for an inspection of a panel 12 having a thickness that is not constant along its length.

The use of the diagnostic device 10 according to the invention requires only the good coupling between the probe 30 and the panel 12 to be inspected to be checked as well as the correct direction of driving of the probe 30 (which can be simplified using optical guides (e.g., lasers) mounted on the probe) so as to ensure in particular that the depth range (i.e., time window 38 (FIG. 6)) analyzed is constant regardless of the thickness of the panel 12. Thus, in contrast to the prior art devices, the diagnostic device 10 according to the present invention does not need to be calibrated for constant panel thicknesses. Indeed, there is therefore no need to know the thicknesses. The inspection can also be performed on areas of changing thicknesses without affecting the result.

It will also be noted that the diagnostic device 10 of the invention is simple to operate and offers an intuitive reading of the results. Thus, it can easily be used by an operator not qualified in the non-destructive inspection technologies.

Accordingly, a person on the ground in an airport, whoever that may be, is provided with this diagnostic device 10 and quickly learns it and uses it to determine whether the visible impact on the aircraft structure inspected has caused or not caused structural damage, like delaminations, and whether the dimension of the damage requires a repair. The grounding of the aircraft is recommended only if necessary.

In order to ensure the correct alignment of the different passes of the probe, a manual realignment function is put in place in order to allow the operator to rectify (to align the strips) the position of the strip on the screen using a cursor.

The taking into account of structural information contained in a digital twin (DMU) of the zone (thickness of the zone, form and location of the noteworthy structural elements such as the stiffener feet, etc.), recorded in or received by the central processing unit of the display device 200, can be performed during the automatic dimensioning.

Figure 7:
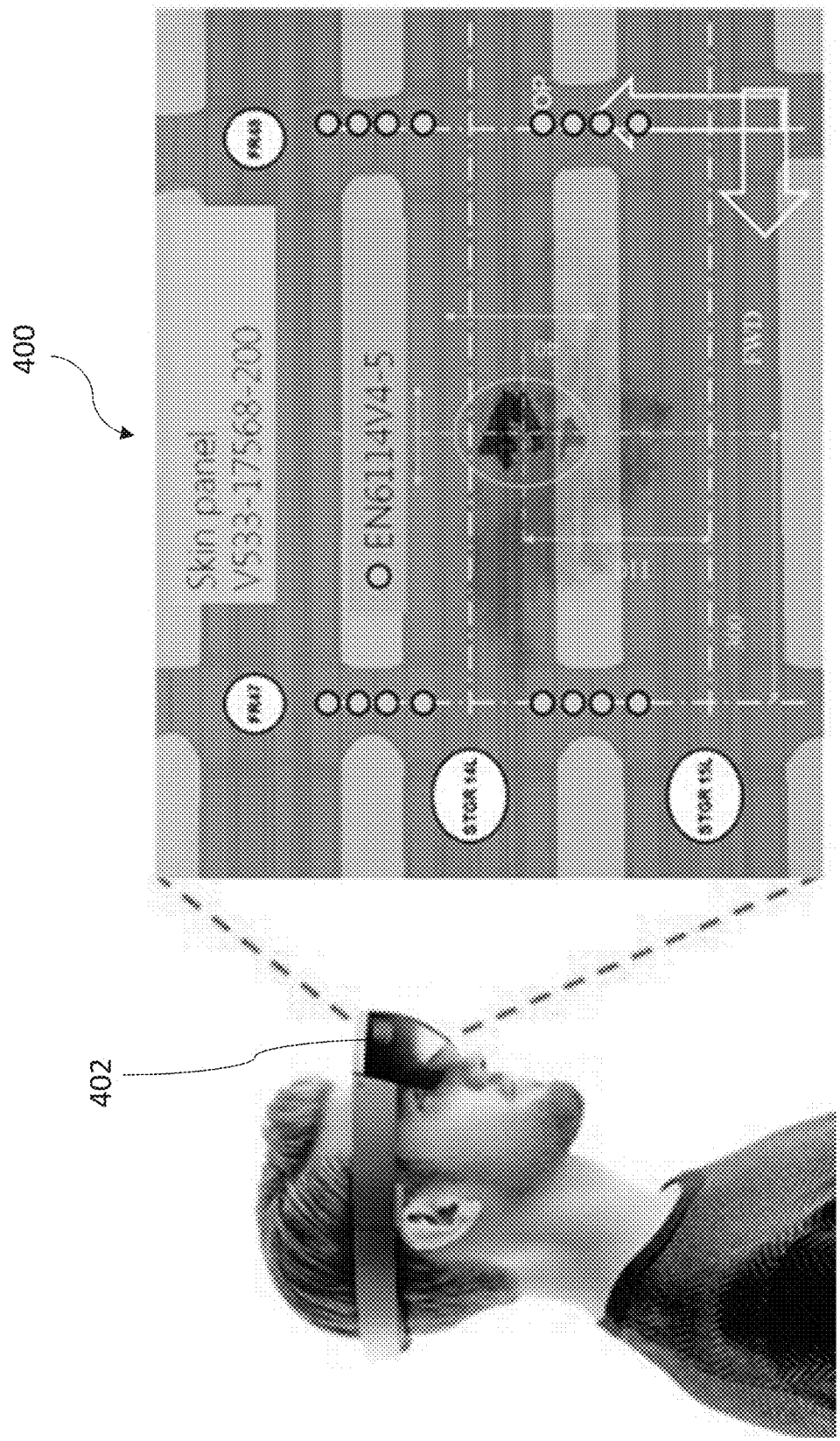

Finally, as indicated above, in some embodiments, the device 10, and specifically the display device 200, produces output data which is configured to be utilized to generate an image or outline 400 (see FIG. 7) of the defect which can be transferred to the inspected zone. For example, the output data could be transmitted to a printer or other similar device in order to generate a 1:1 scale image, i.e., an overlay, of the defects and transferred onto the panel to show the delaminations that have been detected. Additionally, the overlay can show other structural information associated with the inspected zone. It is also contemplated that the device includes an augmented reality device 402 which receives the output data and produces a digital image of the defects (and any additional structural information associated with the inspected zone) on a real time augmented image of the inspected zone when the augmented reality device 402 is pointed at or otherwise receiving an image of the inspected zone.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A diagnostic device for detecting defects in a thickness of a laminated composite panel, the device comprising:
   an ultrasonic probe comprising a wheel housing a plurality of elementary transducers, wherein the wheel is configured to be placed into contact with a laminated composite panel;
   an electronic device, in communication with each of said transducers, and configured to control emission and reception of ultrasonic pulses by said probe by the activation of at least one of the elementary transducers; and,
   a display device, in communication with the electronic device, and configured to:

analyze reflections of ultrasonic signals received by the elementary transducers during an inspection of said laminated composite panel in order to detect a defect and, display, on a display screen, at least one dimension of the defect by automatically analyzing one or more attributes of the reflective signals and sorting the attributes into clusters according to thickness, wherein the clusters define zones without damages, wherein a space between the clusters define a defect zone, and wherein the defect zone is dimensioned by the display device using the zones without damages as limits.

2. The diagnostic device of claim 1 wherein the display device is configured to display, on the display screen, information associated with checking of the elementary transducers of the probe.

3. The diagnostic device of claim 1 wherein the display device is configured to display, on the display screen, three dimensions of the defect.

4. The diagnostic device of claim 3, wherein the three dimensions of the defect are displayed on the display screen as a C-scan mapping.

5. The diagnostic device of claim 4 wherein the display device is configured to display, on the display screen, a C-scan mapping from at least one prior inspection of said laminated composite panel.

6. The diagnostic device of claim 1 wherein the display device is configured to display, on the display screen, a report of the inspection of said laminated composite panel.

7. The diagnostic device of claim 1 wherein the display device is configured to display multiple windows.

8. The diagnostic device of claim 1 wherein the display device is configured to generate output data regarding any defects detected during the inspection.

9. The diagnostic device of claim 8 wherein the output data is configured to be utilized to generate a 1:1 scale image of the defects detected during the inspection.

10. The diagnostic device of claim 8 further comprising:
an augmented reality device configured receive the output data regarding the defects detected during the inspection and to display the defects detected during the inspection on an augmented real-time image of said laminated composite panel.

11. A method for detecting delamination in a panel of laminated composite, said panel having a front face, said method using a diagnostic apparatus including: an ultrasonic probe comprising a plurality of elementary transducers, an electronic device in communication with the elementary transducers, and a display device, wherein the method comprises:

emitting ultrasonic pulses from the elementary transducers into the panel while the ultrasonic probe is in contact with the front face and receiving ultrasonic pulses reflected by the panel;

determining a value of a coupling indicator representing a coupling of the probe with the front face, wherein the determination is performed using data representing the emitted ultrasonic pulses and the received ultrasonic pulses;

comparing a value of the coupling indicator with a predetermined value; and, if the value of the coupling indicator is equal to or greater than said predetermined value, activating a sequence of the elementary transducers by:

emitting an ultrasonic pulse by each of the plurality of elementary transducers toward the panel;

receiving by each of the elementary transducers a pulse reflected by the panel; and, determining a dimension of a defect based on the plurality of reflected pulses received, wherein the dimension of the defect is determined by sorting the plurality of reflected pulses received according to one or more attributes of the reflected pulses into clusters according to their thickness, wherein the clusters define zones without damages, wherein a space between the clusters without damages define a defect zone, and wherein the defect zone is dimensioned by using the zones without damages as limits.

12. The method of claim 11 further comprising:
determining if individual elementary transducers from a plurality of elementary transducers are damaged prior to emitting ultrasonic pulses.

13. The method of claim 11 further comprising displaying a window on the display device which includes a representation of a dimension of the defect.

14. The method of claim 13 further comprising:
generating output data regarding any defects detected.

15. The method of claim 14 further comprising:
utilizing said output data regarding the defects detected to generate an overlay comprising a visual representation of the defects detected; and,
transferring the overlay onto a portion of the panel.

16. The method of claim 14 further comprising:
utilizing said output data regarding the defects detected to generate an augmented real-time image of said laminated composite panel including a visual representation of the defects detected.

* * * * *